United States Patent
Becker et al.

(10) Patent No.: US 7,531,018 B2
(45) Date of Patent: May 12, 2009

(54) MULTI-STAGE APPARATUS FOR SEPARATING LIQUID DROPLETS FROM GASES

(75) Inventors: Stefan Becker, Speyer (DE); Carsten Schippers, Roemerberg (DE); Wolfgang Heikamp, Waldsee (DE); Tobias Neumann, Kuhardt (DE); Andreas Stephan, Speyer (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/783,592

(22) Filed: Apr. 10, 2007

(65) Prior Publication Data

US 2007/0240390 A1    Oct. 18, 2007

(30) Foreign Application Priority Data

Apr. 12, 2006  (DE) ................. 20 2006 006 084

(51) Int. Cl.
*B01D 46/00* (2006.01)

(52) U.S. Cl. .................. 55/423; 55/337; 55/498; 55/DIG. 17

(58) Field of Classification Search ............ 55/DIG. 17, 55/423, 486, 487, 456, 457

See application file for complete search history.

(56) References Cited

U.S. PATENT DOCUMENTS

| | | | | | |
|---|---|---|---|---|---|
| 2,689,623 | A | * | 9/1954 | Schebler | 96/409 |
| 5,053,126 | A | * | 10/1991 | Krasnoff | 210/188 |
| 6,093,231 | A | * | 7/2000 | Read et al. | 55/498 |
| 6,136,076 | A | * | 10/2000 | Read | 96/189 |
| 6,409,804 | B1 | * | 6/2002 | Cook et al. | 95/273 |
| 6,485,535 | B1 | * | 11/2002 | Linnersten et al. | 55/319 |
| 6,585,790 | B2 | * | 7/2003 | Linnersten et al. | 55/319 |
| 6,797,025 | B2 | * | 9/2004 | Linnersten et al. | 55/319 |
| 7,097,683 | B2 | * | 8/2006 | Eppel et al. | 55/423 |

* cited by examiner

*Primary Examiner*—Duane S Smith
*Assistant Examiner*—Sonji Turner
(74) *Attorney, Agent, or Firm*—Crowell & Moring LLP

(57) ABSTRACT

An air deoiling element with a drainage line for discharging the separated liquids, in which the drainage line is integrally mounted to a support member.

7 Claims, 3 Drawing Sheets

MULTI-STAGE APPARATUS FOR SEPARATING LIQUID DROPLETS FROM GASES

BACKGROUND OF THE INVENTION

The invention relates to a device for separating liquid droplets from gases, particularly an air deoiling element. Separators for liquid droplets from gases are used, for instance, to separate water and/or oil from air. Separators of this type are used particularly for deoiling the air in compressors.

A gas stream that comes into contact with liquids may pick up droplets of liquid. Liquid droplets may be entrained mechanically, e.g., as the gas flows through the liquid or is guided over a liquid. In rotary screw compressors, for example, air comes into contact with oil. The oil is used to aid sealing and to cool and lubricate the compressor. Liquid droplets can also be created in a gas stream through condensation. For example, condensation causes liquid droplets to form in a stream of steam. When compressed air is produced, temperatures can reach approximately 200° C. Because of these temperatures, a portion of the oil that is supplied to a rotary screw compressor, for example, evaporates. On subsequent cooling, the oil vapor condenses to droplets and mist. The oil droplets of a rotary screw compressor have a diameter on the order of magnitude of approximately 0.01 µm to 100 µm.

Droplet separators serve to separate liquid droplets from gases. Droplet separators are capable of separating a liquid phase from a gas phase. Droplet separators can be used to clean exhaust streams. With droplet separators, entrained liquid droplets can be separated from process gas streams. This separation can reduce corrosion or erosion of plant parts or caking or deposits on plant parts. Droplet separators are used, for example, to deoil compressed air.

Droplet separators can be configured as inertial separators. In inertial separators, the inertia of the droplets is used to separate the droplets on walls. Inertial separators are suitable particularly for larger droplets, typically having a diameter greater than approximately 20 µm. A simple form of a droplet separator is a baffle plate. In a baffle plate, a gas stream laden with liquid droplets is directed against a plate such that the gas stream changes its direction. Because of their inertia, the droplets contained in the gas stream maintain their direction, strike the plate and are discharged from there. Another type of inertial separation uses centrifugal forces. In centrifugal separators, the gas stream is guided along a curved path. The centrifugal forces cause the droplets to be guided onto an outer path with as large a radius of curvature as possible. Thus, the droplets are concentrated in this outer region. The droplets can then be separated on a wall, for example, along the outer region of the gas stream and can be discharged from that wall. As an alternative, gas with a low concentration of droplets can be removed only from the inner region of the gas stream. Various types of cyclones, for example, can be used as centrifugal separators.

Droplet separators can take the form of drainage elements. In a drainage element, a gas stream laden with liquid droplets is directed through a net-like and/or porous drainage structure. For example, a wire mesh or a nonwoven fabric, e.g., formed of a synthetic material or glass fibers may be used as the drainage structure. Droplets pass through the drainage structure more slowly than the gas stream. Due to gravity, the droplets move to the geodetically lower area of the drainage structure, where they collect and from where they can be discharged.

Inertial separation becomes more efficient the larger the droplets entrained in the gas stream are. To increase the size of the droplets, coalescing elements are used. In these coalescing elements, the gas stream is directed through a net-like and/or porous coalescing structure. This coalescing structure can be formed, for example, of a wire mesh or a nonwoven fabric of e.g., a synthetic material or glass fibers. The gas stream follows the flow lines. The droplets cannot follow the flow lines and adhere to the peripheral areas of the coalescing structure. A liquid film forms on the coalescing structure. Small droplets aggregate to larger droplets, i.e., they coalesce. The larger droplets leave the coalescing structure. Coalescing elements may also exhibit a drainage effect. In this case, the droplets form the liquid film on the coalescing structure, move to the geodetically lower area and can be discharged from there. Thus, a combined coalescing and drainage element may be formed. The larger and therefore heavier droplets exiting from the coalescing structure fall in the gas stream and can therefore also be removed from the gas stream.

Persons skilled in the art know various combinations of drainage and coalescing elements as well as inertial separators for separating liquids from gases, depending on the fields of application. The system described below is known for the deoiling of compressed air from compressors. In a pressure vessel, a cylindrical flow baffle is inserted at the upper end. The cylinder formed by the flow baffle is open at the bottom toward the interior of the pressure vessel. The compressed air flows in tangentially between the flow baffle and the pressure vessel wall, causing a preliminary separation of oil on the wall of the pressure vessel. The separated oil is returned to the compressor. The compressed air flows from below into the air deoiling element, which is located within the cylinder formed by the flow baffle.

The air deoiling element comprises one or more coalescing and/or drainage stages, e.g., a coalescing structure of borosilicate glass fibers and a drainage structure of a nonwoven polyester fabric. The nonwoven fabric formed of borosilicate glass fibers and the nonwoven polyester fabric are each mounted on a metal support member. The flow passes through the air deoiling element from the outside toward the inside. Small liquid droplets aggregate into larger droplets in the coalescing structure and in part already sink in the coalescing structure. Larger droplets exiting the coalescing structure sink further within the drainage structure and collect on the bottom of the air deoiling element. The oil on the bottom of the air deoiling element is returned to the compressor through a drainage line. The deoiled compressed air is transported from the pressure vessel into an accumulator.

A drawback in the described air deoiling system, which is used, for example, in rotary screw compressors, is that the drainage line is configured separately. The drainage line is a freestanding tube usually located in the center of the air deoiling element and is fixed to the air deoiling element. The drainage line is typically guided upwardly out of the air deoiling element and must then be connected to a line, e.g., a hose line leading to the compressor, so that the oil can be returned to the compressor. The drainage line is therefore sensitive to forces that may act on the line in the area where the drainage line is guided out of the air deoiling element. Malpositioning may occur during manufacture of the air deoiling element.

SUMMARY OF THE INVENTION

Thus, it is an object of the invention to provide a device for separating liquids from gases, which makes it easier to position the drainage line during manufacture.

A further object of the invention is to provide a device for separating liquids from gases in which the drainage line is less sensitive to the effect of forces.

These and other objects are attained by a device for separating liquids from gases in which a drainage line is integrally mounted to a support tube. Mounting the drainage line to the support tube eliminates the need for separate positioning of the drainage line during manufacture. Since the drainage line is mounted to the support tube, it is better able to withstand mechanical loads.

The drainage line can be welded or injection molded onto the support tube or integrally formed together with the support tube. The drainage line can also be inserted into a tubular holder of the support tube or clipped to the support tube. These different fixation options make it possible to optimize the manufacture of the device for separating liquids from gases.

Preferably, an opening is provided on the support member, into which the drainage line can be inserted. This can, for example, be a tube mounted to the support member into which the drainage line can be inserted. If the support member is composed of a plurality of modules, the drainage line can be pushed through the tubular openings of the several modules to eliminate the need for seals of the drainage line between the support modules.

These and additional features of preferred embodiments of the invention set forth not only in the claims but also in the specification and the drawings, and the individual features can be realized each by itself or together in the form of subcombinations in embodiments of the invention and in other fields, and may constitute advantageous, independently patentable embodiments, for which protection is hereby claimed.

BRIEF DESCRIPTION OF THE DRAWINGS

The invention will be described in further detail hereinafter with reference to illustrative preferred embodiments shown in the accompanying drawing figures, in which:

FIG. 1b is an exploded view of the components of the device of FIG. 1a, and

DETAILED DESCRIPTION OF PREFERRED EMBODIMENTS

In an air compressor system with a rotary screw compressor approximately 5 kg of oil are added for each $m^3$ of air during the production of compressed air. The oil is used to lubricate the compressor and to aid sealing. In a conventional air compressor system intended to generate so-called oil-free compressed air, i.e., compressed air with an oil content of approximately 1 to 3 $mg/m^3$ air, the oil-containing compressed air must be deoiled. In a conventional air compressor system a preliminary separation takes place in a pressure vessel. The preliminary separation is achieved in that the oil-containing air flows tangentially into the pressure vessel. The air flows around a cylindrical insert in the pressure vessel into which an air deoiling element is inserted to further separate the oil. The tangential entry and the separation of oil on the wall of the pressure vessel, which acts as an impact plate or baffle, makes it possible to reduce the oil concentration in the compressed air arriving at the air deoiling element in the pressure vessel to approximately 2 to 5 $g/m^3$ of air. The separated oil is returned to the compressor.

Figure 1A:
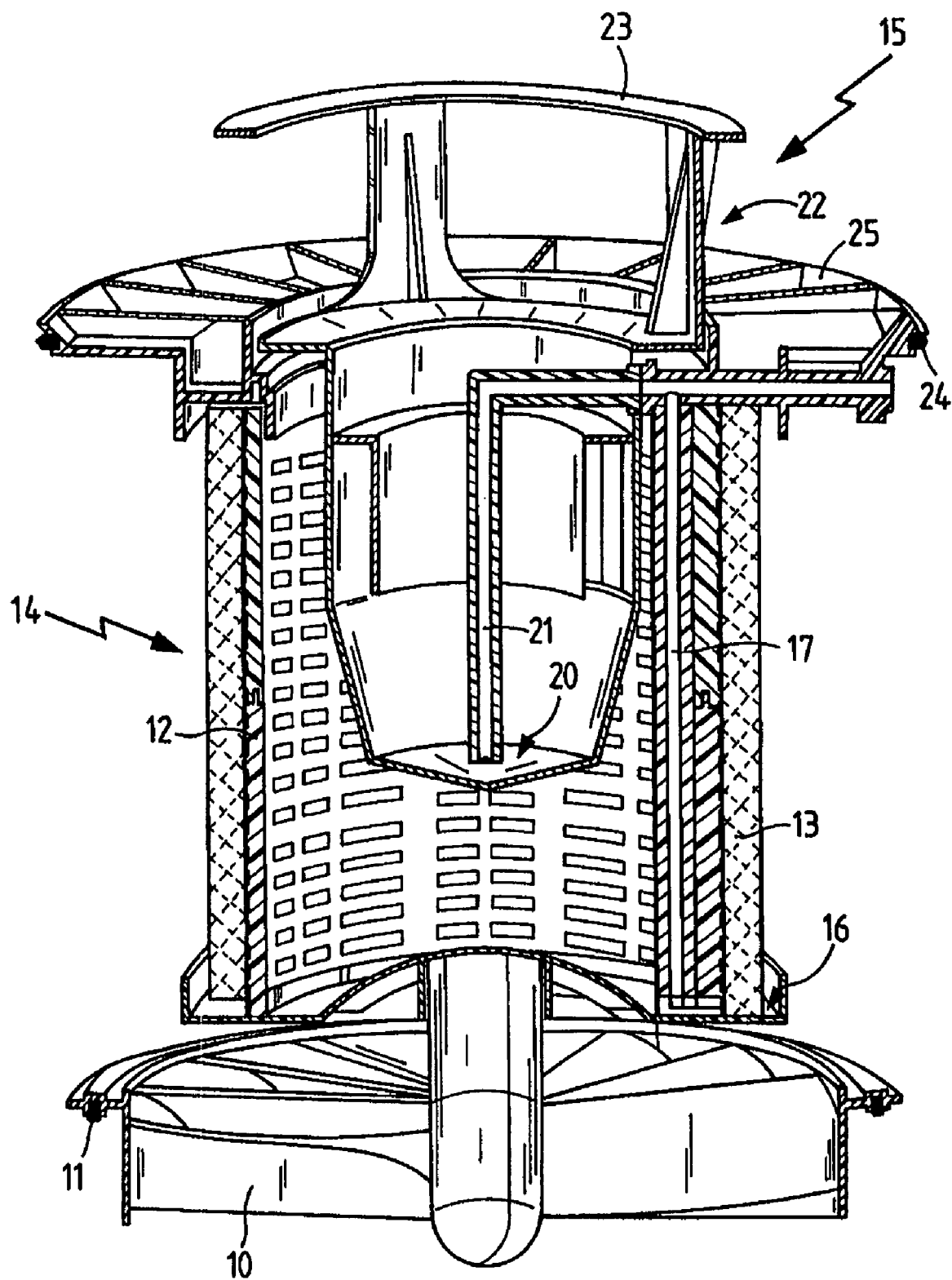
FIG. 1a shows a device for separating liquids from gases, which can be used for air deoiling in an air compressor system with a rotary screw compressor.
Figure 1B:
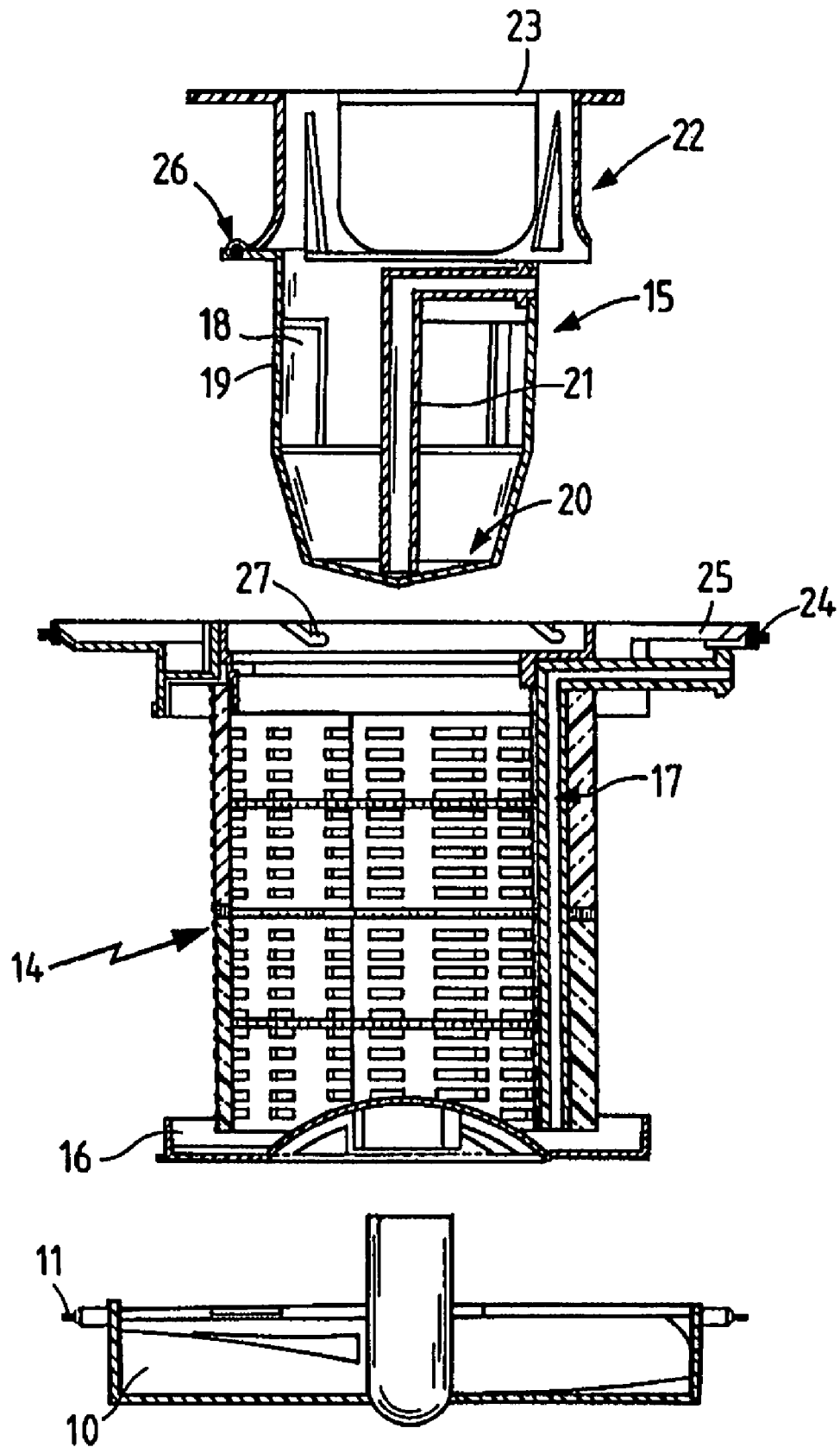

In the embodiment of the invention illustrated in FIGS. 1a and 1b, the oil-containing air can arbitrarily flow into the pressure vessel. In the pressure vessel the oil-containing air flows from below through the guide apparatus of an inline cyclone used as a preseparator 10. The guide apparatus/preseparator 10 has a lip 11, which provides only an incomplete seal relative to the pressure vessel wall, so that oil can flow down along the wall of the pressure vessel. This separates the pressure vessel into an untreated air region and a preseparator region. A preseparator configured in this manner can reduce the oil concentration to less than 0.5 $g/m^3$ of air. Oil that is separated on the wall or on the preseparator collects in the lower area of the pressure vessel, from where it can be returned to the compressor through an oil return line. The oil concentration, which is lower than that obtained by conventional air deoiling systems, provides a greater degree of freedom in the design of the main separator 14 and/or the post-separator 15 since these have to achieve lower separation rates.

From the preseparation area, the air flows through a main separator, which in the embodiment illustrated in FIG. 1a is a coalescing structure formed of a non-woven borosilicate glass fiber fabric 13 mounted on a support tube 12. As the gas flows through the non-woven fabric 13, smaller droplets aggregate to larger droplets. At the same time the droplets move downwardly within the coalescing structure. The downwardly moving droplets collect in a first trough 16 together with large droplets that come out of the coalescing structure and fall downward in the gas stream in the interior of the support tube 12. The separated oil is returned from the trough 16 through a first drainage line 17. In FIGS. 1a and 1b the first drainage line 17 is welded to the support tube 12.

The air stream flowing out of the main separator 14 to the post-separator 15 essentially contains larger oil droplets, which can be separated in the post separator 15. In the embodiment depicted in FIGS. 1a and 1b an inverted cyclone 18 is used for post-separation. In the inverted cyclone the air is set into rotation, so that the oil droplets are separated on the wall 19 of the inverted cyclone 18. The oil droplets slide along the wall 19 of the inverted cyclone 18 into the second trough 20, from where they are returned to the compressor through a second drainage line 21. The second drainage line 21 in the embodiment illustrated in FIGS. 1a and 1b is connected to the first drainage line 17, but could also extend separately.

The post-separator 15 comprises a spacer 22 having a mounting ring attached to its upper end. The device for separating liquids from gases can be mounted in the pressure vessel by this mounting ring 23. A separation plate 25 disposed at the upper end of the main separator 14 provides a seal through a gasket 24 relative to the pressure vessel. The separation plate 25 separates the preseparator gas region from the deoiled air which exits the post-separator 15.

FIG. 1b illustrates the modular construction of the device for separating liquids from gases. The pre-separator 10, which is configured as an inline cyclone, the main separator 14 and the post separator 15 are modular components. The modules can be assembled, for example, using a bayonet joint. Pins 26 and recesses 27 for the pins 26 for coupling the post-separator 15 to the main separator 14 are shown. Other mating, latching or screwed connections are of course also feasible. The modules may also be welded together.

All the individual modules of FIG. 1b can be formed of synthetic resin material (i.e. plastic), particularly a glass fiber-reinforced polyamide. The first drainage line 17 can be fixed to the support tube by vibration welding, ultrasonic welding or hot plate welding. The required seals 11, 26 or additional seals may be injection-molded or they may be O-rings that are inserted into grooves. Because of the modular construction, it is possible to interchange modular elements. For example, a spiral cyclone and a second inline cyclone may be used instead of the inverted cyclone 18. Main separators of different heights and with differently sized surfaces of the coalescing structure may be used. If the preseparator, main separator and post-separator modules are detachably coupled together, it is also possible to replace only one module during servicing. For example, the inline cyclone 10 and the post-separator 15 could be lifetime components so that only the main separator 14 with the nonwoven fabric 13 would have to be replaced.

Figure 2:
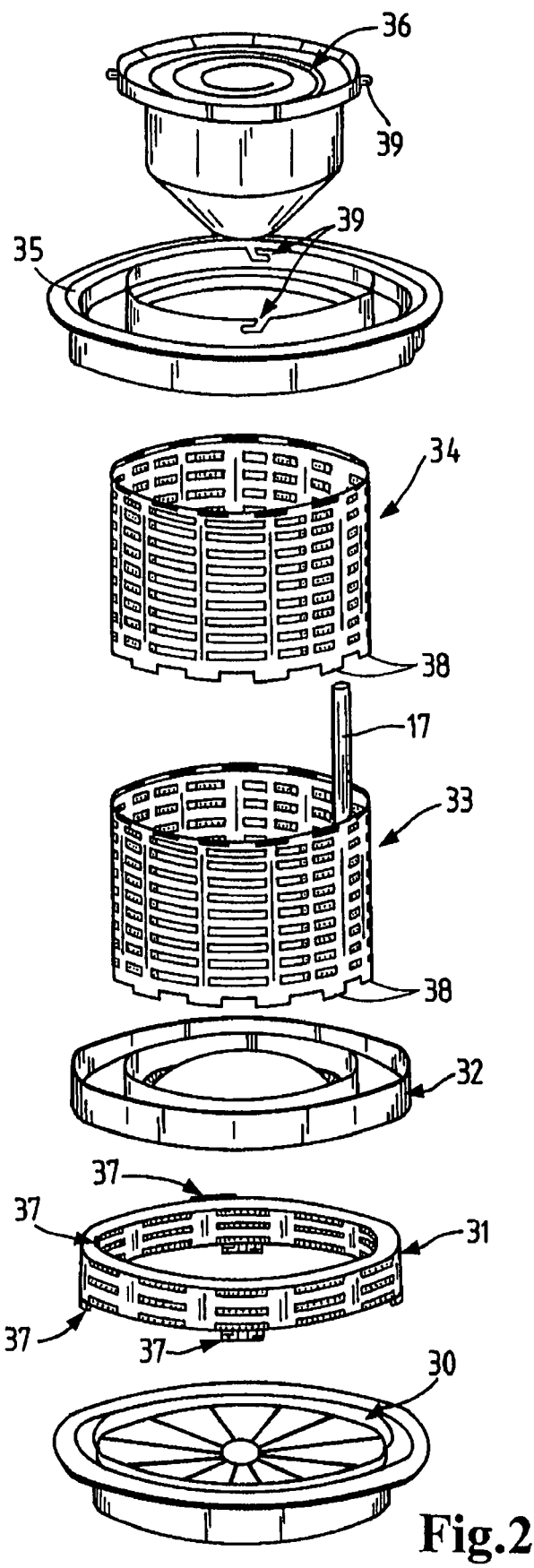
FIG. 2 shows an alternative device for separating liquids from gases, which can be used for deoiling compressed air in an air compressor system with a rotary screw compressor, comprising a primary separator assembled from a plurality of support tubes.

FIG. 2 is an exploded view of the components of an embodiment of the device for separating liquids from gases comprising a main separator assembled from a plurality of support tubes. In the embodiment of FIG. 2, an inline cyclone 30 is used as a preseparator. The inline cyclone 30 can be detachably connected to an oil collection trough 32 via a spacer 31 with latching connections 37. The oil collection trough 32 can be coupled to a first support tube 33 by mating connections 38. A second support tube 34 constructed identically to the first support tube 33 can be fixed to the first support tube 33 by mating connections 38. Additional support tubes, which are not shown, can be added.

In the schematic representation of FIG. 2, the non-woven fabric surrounding the support tube is not depicted. The nonwoven fabric can be wound around the support member and adhesively bonded to the end closure element 35. When the nonwoven fabric is glued together with the end closure element, a portion of the drainage line 17 can be glued together with an additional portion of the drainage line and/or with the connecting element of the drainage line for connection to the pressure vessel on the end closure element 35. The end closure element 35 can in turn be connected to the second support tube 34 by a mating connection.

A spiral cyclone 36 acting as a post-separator may be inserted into the end closure element 35. In the embodiment shown in FIG. 2, the spiral cyclone 36 is detachably mounted to the end closure element 35 by a bayonet joint 39. The first drainage line 17 can be clipped to the assembled support tubes 33, 34. Alternatively, the drainage line 17 can be inserted into an opening on the support member modules 33 and 34. Preferably, a one-piece drainage line 17 is inserted into a tubular opening of the support member modules 33, 34. It is also possible, however, to attach drainage lines 17 to the individual support member modules 33, 34, which are then sealed relative to one another when the support member modules 33, 34 are assembled.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air deoiling device, comprising a coalescer support member, an oil coalescing structure attached to and surrounding the coalescer support member, and a drainage line for discharging separated liquids from the device, wherein the drainage line is integrally mounted to the coalescer support member.

2. A device as claimed in claim 1, wherein the support member is a support tube and the drainage line is welded, clipped, bonded or injection molded onto the support tube, integrally manufactured with the support tube or inserted into a seat of the support tube.

3. A device as claimed in claim 2, wherein the drainage line is inserted into an opening of the support tube.

4. A device as claimed in claim 3, wherein the opening is a tubular opening.

5. A device as claimed in claim 1, wherein the integrally mounted drainage line is connected to an end closure element when a winding is glued to the support member.

6. A device as claimed in claim 1, wherein a one-piece drainage line is mounted to a support member assembled from a plurality of components.

7. A device as claimed in claim 1, wherein the device is inserted into a pressure vessel.

\* \* \* \* \*